(12) United States Patent
Rei et al.

(10) Patent No.: US 11,514,349 B1
(45) Date of Patent: Nov. 29, 2022

(54) APPARATUS AND METHODS OF UNSUPERVISED MACHINE LEARNING MODELS TO IDENTIFY SEASONALITY AND PREDICTING SEASONALLY-INFLUENCED METRIC VALUES

(71) Applicant: Topia Limited, San Francisco, CA (US)

(72) Inventors: Mervi Sepp Rei, Tallinn (EE); Sten Tamkivi, Harjuma (EE); Ardo Illaste, Calgary (CA); Venkata Surendra Reddy Polam, Tallinn (EE); Okan Polatkan, Tallinn (EE)

(73) Assignee: Topia Limited, San Francisco, CA (US)

( * ) Notice: Subject to any disclaimer, the term of this patent is extended or adjusted under 35 U.S.C. 154(b) by 0 days.

(21) Appl. No.: 17/028,546

(22) Filed: Sep. 22, 2020

Related U.S. Application Data

(63) Continuation of application No. 16/901,703, filed on Jun. 15, 2020.

(51) Int. Cl.
*G06N 7/00* (2006.01)
*G06N 20/00* (2019.01)

(52) U.S. Cl.
CPC .............. *G06N 7/005* (2013.01); *G06N 20/00* (2019.01)

(58) Field of Classification Search
None
See application file for complete search history.

(56) References Cited

U.S. PATENT DOCUMENTS

| 9,589,278 B1* | 3/2017 | Wang ................. G06Q 30/0275 |
| 2014/0095422 A1* | 4/2014 | Solomon ................. G06N 5/02 |
| | | 706/46 |
| 2017/0279698 A1* | 9/2017 | Sartran ................. H04L 41/142 |

FOREIGN PATENT DOCUMENTS

CN          112199790 A  *  1/2021     ............. G06F 30/20

OTHER PUBLICATIONS

US 10,437,640 B2, 10/2019, Lecue (withdrawn)*
Reddy, A. et al., "Using Gaussian Mixture Models to Detect Outliers in Seasonal Univariate Network Traffic," 2017 IEEE Symp. on Security and Privacy Workshops (2017) pp. 229-234. (Year: 2017).*

(Continued)

*Primary Examiner* — Brian M Smith
(74) *Attorney, Agent, or Firm* — Cooley LLP

(57) ABSTRACT

In some embodiments, an apparatus includes a geometric aggregator that receives data for a set of time periods and a location. The data has a first set of first metric values and a set of second metric values for each time period and lacks a mixture of Gaussian distributions. The geometric aggregator calculates a geometric aggregation of the data for each time period to produce a first metric value from a second set of first metric values, having a mixture of Gaussian distributions. The apparatus includes a Gaussian mixture model that predicts a set of Gaussian distributions, each uniquely associated with a season, within a set of histogram values for the data based on the second set of first metric values. The apparatus includes a presentation portion that produces a set of adjusted first metric values based on the set of histogram values, each uniquely associated with a season.

13 Claims, 7 Drawing Sheets

400 select a set of locations within a predefined distance of the first location 401 perform the receiving, the calculating, the applying and the producing for data for the set of time periods and the set of locations, to produce a set of adjusted first metric values for each location from the set of locations 402 calculate a variance between the set of adjusted first metric values for the first location and the set of adjusted first metric values for each location from the set of locations 403 identify outlier status for at least one of the first location or any location from the set of locations based on the variance for the first location and each location from the set of locations 404

(56) References Cited

OTHER PUBLICATIONS

Yu, J. et al., "A Gaussian mixture copula model based localized Gaussian process regression approach for long-term wind speed projection," Energy vol. 61 (2013) pp. 673-686. (Year: 2013).*
Hastie & Tibshirani, "Gaussian Mixture Models," Course Notes for Stats 315, Stanford University, downloaded from < statweb.stanford. edu~tibsstat315aLECTUREsem.pdf> (Nov. 2008) 23 pp. (Year: 2008).*
Gage, T., "Modeling birthweight and gestational age distributions: additive vs. multiplicative processes," American Journal of Human Biology, vol. 14 (2002) pp. 728-734 (Year: 2002).*
Nardo, M. et al., "Tools for composite indicators building," European Commission, Ispra (2005) 134 pp. (Year: 2005).*

* cited by examiner

300

- receive data for a set of time periods and a location, the data having a first set of first metric values and a set of second metric values for each time period from the set of time periods 301

- calculate, for each time period from the set of time periods, a geometric aggregation of the data for that time period to produce a first metric value from a second set of first metric values 302

- apply an unsupervised machine learning Gaussian mixture model to the second set of first metric values to predict a set of Gaussian distributions within a set of histogram values for the data, each Gaussian distribution from the set of Gaussian distributions being uniquely associated with a season from a set of seasons over the set of time periods 303

- produce a set of adjusted first metric values based on the set of histogram values, the set of adjusted first metric values including a set of subsets, each subset from the set from the set of subsets having a common adjusted first metric value from the set of adjusted first metric values and being uniquely associated with a season from the set of seasons 304

- determine whether to retrain the unsupervised machine learning model Gaussian mixture model and to recalculate the geometric aggregation 305

- send a signal representing the set of adjusted first metric values to cause an action for a future time period based on the set of adjusted first metric values, the future time period being after and uniquely associated with a time period from the set of time periods 306

FIG. 3

400 select a set of locations within a predefined distance of the first location 401

↓ perform the receiving, the calculating, the applying and the producing for data for the set of time periods and the set of locations, to produce a set of adjusted first metric values for each location from the set of locations 402

↓ calculate a variance between the set of adjusted first metric values for the first location and the set of adjusted first metric values for each location from the set of locations 403

↓ identify outlier status for at least one of the first location or any location from the set of locations based on the variance for the first location and each location from the set of locations 404

FIG. 4

APPARATUS AND METHODS OF UNSUPERVISED MACHINE LEARNING MODELS TO IDENTIFY SEASONALITY AND PREDICTING SEASONALLY-INFLUENCED METRIC VALUES

CROSS-REFERENCE TO RELATED APPLICATIONS

This application is a continuation of U.S. application Ser. No. 16/901,703, filed on Jun. 15, 2020, which is hereby incorporated by reference in its entirety.

TECHNICAL FIELD

The present disclosure relates to the field of artificial intelligence/knowledge processing systems, and in particular to apparatus and methods for training and using geometric aggregators and unsupervised machine learning Gaussian mixture models for identifying seasonality and predicting seasonally-influenced metric values.

BACKGROUND

Known classification models are useful in modeling statistical relations in data in a range of applications such as medicine, image processing, data analytics, market assessment, and/or the like. General known rule-based classification models (e.g., K-mean clustering methods) do not include an uncertainty measure or a probability measure indicating how likely is that a data belongs to a certain class or cluster. On the other hand, known soft classification models do not perform well when dealing with noisy data in a multi-criteria decision making problems. Thus, a need exists for apparatus and methods to improve classification models for processing a wider variety of data.

SUMMARY

In some embodiments, an apparatus includes a memory (e.g., a random access memory) and a processor (e.g., a central processing unit) operatively coupled to the memory to execute an unsupervised machine learning model (e.g., a Gaussian mixture model). The processor includes a geometric aggregator that receives data for a set of time periods and a location. The data includes a first set of first metric values and a set of second metric values for each time period from the set of time periods. The data for the set of time periods and the location lacks a mixture of Gaussian distributions. The geometric aggregator calculates, for each time period from the set of time periods, a geometric aggregation of the data for that time period to produce a first metric value from a second set of first metric values. The second set of first metric values includes a mixture of Gaussian distributions. The processor includes a Gaussian mixture model that receives the second set of first metric values from the geometric aggregator. The Gaussian mixture model predicts a set of Gaussian distributions within a set of histogram values for the data based on the second set of first metric values. Each Gaussian distribution from the set of Gaussian distributions is uniquely associated with a season from a set of seasons over the set of time periods. The processor includes a presentation portion that produces a set of adjusted first metric values based on the set of histogram values. The set of adjusted first metric values include a set of subsets. Each subset from the set of subsets includes a common adjusted first metric value from the set of adjusted first metric values and is uniquely associated with a season from the set of seasons.

BRIEF DESCRIPTION OF THE DRAWINGS

FIG. 3 is a flowchart illustrating a method of Gaussian classification, according to an embodiment.

FIG. 4 is a flowchart illustrating a method of auditing Gaussian classification, according to an embodiment.

DETAILED DESCRIPTION

Figure 1:
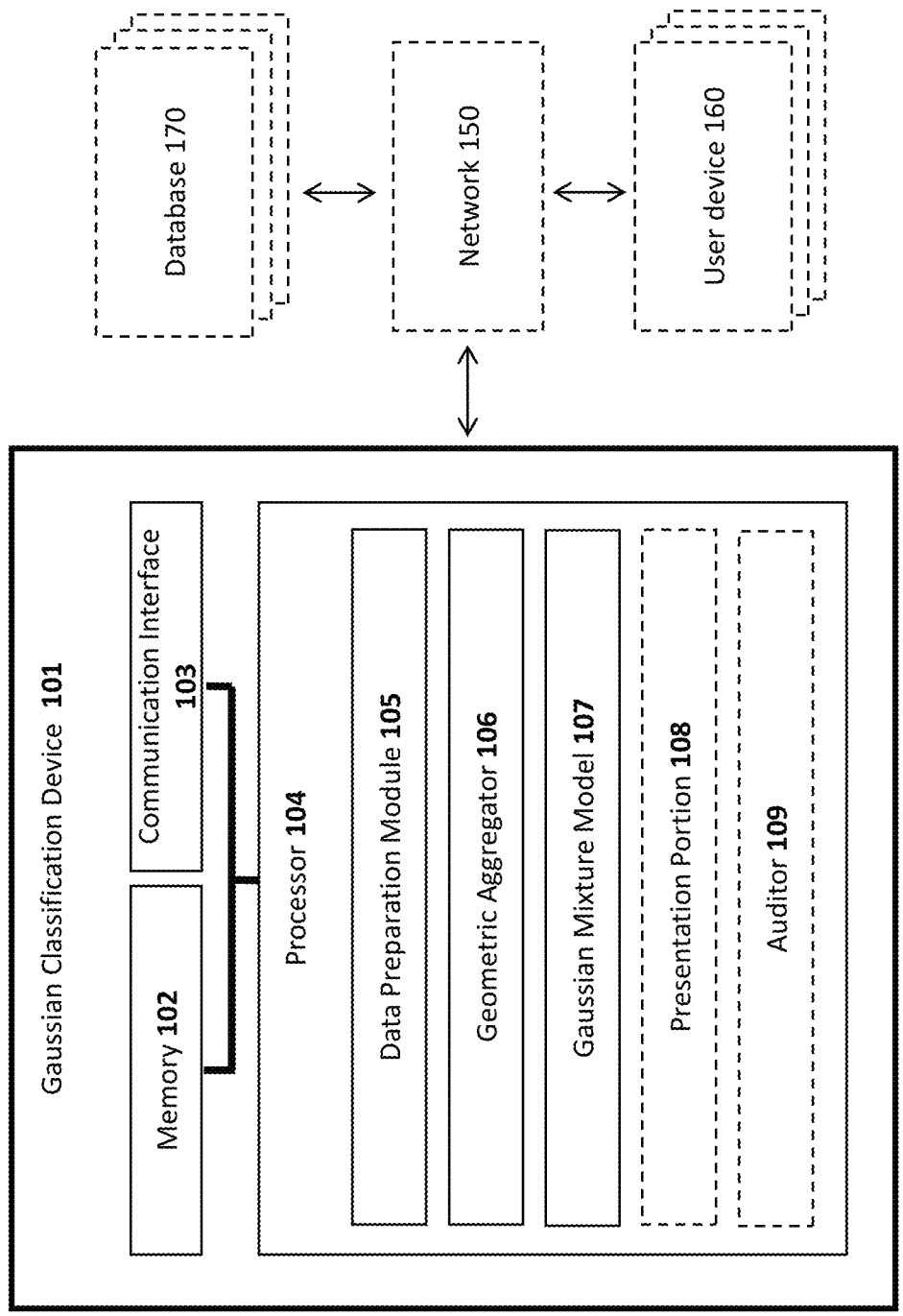
FIG. 1 is a schematic description of a Gaussian classification device, according to an embodiment.

Non-limiting examples of various aspects and variations of the embodiments are described herein and illustrated in the accompanying drawings.

One or more embodiments described herein generally relate to apparatus, methods, and systems for dynamically processing structured and semi-structured data, and in particular, apparatus, methods, and systems that use a geometric aggregator in addition to a Gaussian mixture model to efficiently and reliably classify the structured and semi-structured-data. Apparatus, methods and systems of Gaussian classification are disclosed. In some embodiments, Gaussian classification can be used to process, for example, metric values in form of time series including, stationary data, non-stationary-data, linear data, non-linear data, seasonal data, periodic data, chaotic data, univariate data, multivariate data, and/or the like.

Described herein are Gaussian classification devices that are suitable models for highly reliable identification of seasonality and predicting seasonally-influenced values. One or more Gaussian classification devices described herein include a Gaussian mixture model trained based on data processed by a geometric aggregator. Execution of the Gaussian mixture model with the geometric aggregator can generalize the application of the Gaussian mixture model to process noisy data that could not be effectively processed using Gaussian mixture models alone. Use of the geometric aggregator with the one or more Gaussian classification devices described herein enables the Gaussian mixture model to effectively process noisy data (alternatively or in addition to noise-free data), and to identify a set of Gaussian distributions that are eventually used to identify seasonal insights in the data. Otherwise, a standalone Gaussian mixture model would fail to identify mixed Gaussian profiles and seasonality in the noisy data. In one or more interpretations, the Gaussian classification devices described herein use the geometric aggregator to transform the noisy data to representations that can be better analyzed by the Gaussian mixture model to identify seasonality in the representations of the noisy data and consecutively in the noisy data. Use of Gaussian mixture models is generally known as a stand-alone solution for classification for data that is not noisy, and therefore has not been explored in combination with other data processing methods (or other machine learning models) to allow for the classification of noisy data.

Embodiments described herein provide methods and systems for classifying metric values such as, for example, metric values associated with time, metric values associated with location, metric values associated with environmental factors (e.g., temperature, humidity, etc.), metric values with economic indicators, metric values with social factors, and/or the like. In some instances, the metric values can include text data, numerical data, symbolic data, and/or the like.

While the methods and apparatus are described herein as processing data from a set of files, a set of tables, a set of documents, a set of databases, and/or the like, in some instances a Gaussian classification device 101 can be used to generate the set of files, the set of tables, the set of documents, the set of databases. Therefore, the Gaussian classification device 101 can be used to process and/or generate any collection or stream of data, events, and/or objects. As an example, the Gaussian classification device 101 can process and/or generate any string(s), number(s), image(s), video(s), executable file(s), dataset(s), Uniform Resource Locator (URL), global positioning system (GPS) data, name(s), address(es), telephone number(s), email address(es), and/or the like. For further examples, the Gaussian classification device 101 can be used to execute or process an application programming interface (API), a function(s) of a software code(s), a webpage(s), a data file(s), a data stream(s), a model file(s), a source file(s), a script(s), a table(s) in a database system, a document-processing macro(s), an e-mail message(s), a text message(s), and/or the like.

FIG. 1 is a schematic description of a Gaussian classification device 101 (also referred to herein as a 'Gaussian discriminant analysis device'), according to an embodiment. The Gaussian classification device 101 includes an unsupervised machine learning model that can be used to classify data for a set of time periods and/or a set of locations to Gaussian distributions representing classes (e.g., seasonal classes). The Gaussian classification device 101 can be operatively coupled to a set of user devices 160 and/or a set of databases 170 to transmit and/or receive data and/or analytical models via a network 150. The Gaussian classification device 101 and/or the set of user devices 160 each can be a hardware-based computing device and/or a multimedia device, such as, for example, a computer, a desktop, a laptop, a smartphone, a tablet, a wearable device, and/or the like.

The Gaussian classification device 101 includes a memory 102, a communication interface 103, and a processor 104. The Gaussian classification device 101 can receive data for a set of time periods and a set of locations from a data source. The data source can include, for example, a file(s), a social network(s), a user device(s) 160, a database(s) 170, and/or the like. The Gaussian classification device 101 receives the data for the set of time periods and the set of locations in response to a user of the Gaussian classification device 101 providing an indication to begin classifying the data.

The network 150 can be a digital telecommunication network of servers and/or compute devices. The servers and/or computes device on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The set of user devices 160 are compute devices operatively coupled to the Gaussian classification device 101. The set of user devices 160 are compute devices that can transmit and/or receive data and/or analytical models to the Gaussian classification device 101. The set of user devices 160 can include, for example, personal computers, laptops, smartphones, or so forth, each including a memory (not shown), a communication interface (not shown) and/or a processor (not shown). The processor can include a hardware based integrated circuit (IC) or any other suitable processing device configured to run and/or execute a set of instructions or code. The memory can include a hardware based charge storage electronic device or any other suitable data storage medium configured to store data for long term or batch processing of the data by the processor.

The set of databases 170 are compute device mediums particularly for data storage purpose and can include, for example, a network of electronic memories, a network of magnetic memories, a server(s), a blade server(s), a storage area network(s), a network attached storage(s), deep learning computing servers, deep learning storage servers, and/or the like. Each database 170 can include a memory (not shown), a communication interface (not shown) and/or a processor (not shown). The memory can store the data, the processor can analyze the data, and the communication interface can receive/transmit the data from/to the Gaussian Classification device 101 via the network 150.

The memory 102 of the Gaussian classification device 101 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 102 can store, for example, one or more software modules and/or code that includes instructions to cause the processor 104 to perform one or more processes or functions (e.g., a data preparation module 105, a geometric aggregator 106, a Gaussian mixture model 107, a presentation portion 108 (also referred to herein as a 'presentation module'), or an auditor 109).

The memory 102 can store a set of files associated with (e.g., generated by executing) the geometric aggregator 106 and/or the Gaussian mixture model 107. The set of files associated with the geometric aggregator 106 and/or the Gaussian mixture model 107 can include data generated by the geometric aggregator 106 and/or the Gaussian mixture model 107 during the operation of the Gaussian classification device 101. For example, the set of files associated with the geometric aggregator 106 and/or the Gaussian mixture model 107 can include temporary variables, return memory addresses, variables, a graph of the geometric aggregator 106 and/or the Gaussian mixture model 107 (e.g., a set of arithmetic operations or a representation of the set of arithmetic operations used by the geometric aggregator 106 and/or the Gaussian mixture model 107), the graph's metadata, assets (e.g., external files), electronic signatures (e.g., specifying a type of the geometric aggregator 106 and/or the Gaussian mixture model 107 being exported, and the input/output tensors), and/or the like, generated during the operation of the geometric aggregator 106 and/or the Gaussian mixture model 107.

The communication interface 103 of the Gaussian classification device 101 can be a hardware component of the Gaussian classification device 101 to facilitate data communication between the Gaussian classification device 101 and external devices (e.g., the set of user devices 160, the set of databases 170, and/or the like) or internal components of the Gaussian classification device 101 (e.g., the memory 102, the processor 104). The communication interface 103 is operatively coupled to and used by the processor 104 and/or the memory 102. The communication interface 103 can be, for example, a network interface card (NIC), a module, a Bluetooth® module, an optical communication module, and/or any other suitable wired and/or wireless communication interface. The communication interface 103 can be configured to connect the Gaussian classification device 101 to the network 150, as described in further detail herein. In some instances, the communication interface 103 can facilitate receiving or transmitting data via the network 150. More specifically, in some implementations, the communication interface 103 can facilitate receiving or transmitting first metric values, second metric values, the Gaussian mixture model 107, and/or the like through the network 150 from or to the set of user devices 160, or the set of databases 170, each communicatively coupled to the Gaussian classification device 101 via the network 150. In some instances, data received via communication interface 103 can be processed by the processor 104 or stored in the memory 102, as described in further detail herein.

The processor 104 can be, for example, a hardware based integrated circuit (IC) or any other suitable processing device configured to run or execute a set of instructions or a set of codes. For example, the processor 104 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 104 is operatively coupled to the memory 102 through a system bus (for example, address bus, data bus, and/or control bus, not shown).

The processor 104 can include a data preparation module 105, a geometric aggregator 106, a Gaussian mixture model 107, a presentation portion 108, or an auditor 109. Each of the data preparation module 105, the geometric aggregator 106, the Gaussian mixture model 107, the presentation portion 108, or the auditor 109 can include software stored in the memory 102 and executed by the processor 104. For example, a code to cause the Gaussian mixture model 107 to generate a set of Gaussian distributions (e.g., seasons) can be stored in the memory 102 and executed by the processor 104. Alternatively, each of the data preparation module 105, the geometric aggregator 106, the Gaussian mixture model 107, the presentation portion 108, or the auditor 109 can be a hardware-based device. For example, a process to cause the Gaussian mixture model 107 to generate the set of Gaussian distributions (e.g., seasons) can be implemented on an individual integrated circuit chip.

The data preparation module 105 can be configured to receive data for a set of time periods (e.g., from Mar. 12, 2014 to Dec. 1, 2016, from 5:00 AM to 10:00 PM, and or the like) and a set of locations (e.g., London, Tokyo, New York, and/or the like) from a data source. The data include a first set of first metric values and a set of second metric values for each time period from the set of time periods. The data can be prepared to be used by the geometric aggregator 106 or the Gaussian mixture model 107. In some implementations, the data preparation module 105 identifies and/or extracts a set of features in the data. The set of features can be, for example, part of the set of time periods, a part of the set of locations, and/or the like. The first metric values and the second metric values can be any seasonally-influenced data that, in some instances, can be automatically obtained as time series from a time-dynamic data source such as for example, a sensor, a database on the Internet, a stream of data, a video stream, and/or the like.

The data preparation module 105 receives the data and can normalize the data to a common scale. Normalization can involve transforming data into a common format to improve cross-compatibility of the data or the set of features among various modules of the Gaussian classification device 101. In some instances, the data preparation module 105 can format a set of data files that contain the data to a common character format such as American Standard Code for Information Interchange (ASCII) format, Unicode format, and/or the like. In some instances, the data preparation module 105 can format a set of data files that contain the data to comma-separated values (CSV) file formats. In some instances, the data preparation module 105 can normalize a set of numbers of the data to a range from 0 to 1. In some instances, the data preparation module 105 can convert units of the set of dimensions from the English unit such as, for example, mile, foot, inch, and/or the like, to the International System of units (SI) such as, for example, kilometer, meter, centimeter, and/or the like.

The data preparation module 105 can be configured further to resize the data for the set of time periods and the set of locations to a common size before further processing (e.g., training the Gaussian mixture model 107). For example, the data preparation module 105 can divide the data for the set of time periods and the set of location to a set of batches with equal number of time periods and/or locations in each batch for better utilization of a cache memory of a central processing unit (CPU) of the Gaussian Classification Device 101.

The geometric aggregator 106 can be used to calculate a representative of the first metric value for a duration (e.g., one day) from a set of first metric values, for a given second metric value. The geometric aggregator 106 can multiply pairs of first metric values and second metric values. In some implementations, the product of pair multiplication with the lowest value can be identified. Alternatively, in some implementations, the highest product can be selected. In some instances, for a given location pair (e.g., London-Singapore, Tokyo-Moscow, etc.) a set of first metric values and/or a set of second metric values are available. The set of first metric values and the set of second metric values can be referred to as two dimensions, where a first metric value is desired to be selected from the first dimension. For each combination of the set of first metric values and the set of second metric values, a value of each first metric value is multiplied by a value of each second metric value to generate a set of products. The lowest product can be selected, and the first metric value for that lowest product can be presented for the given location pairs. The aforementioned process can then be repeated over multiple days within a given time period (e.g., for a week, a quarter, a year, etc.) to generate a second set of first metric values.

The Gaussian mixture model (GMM) 107 can be configured to accept the second set of first metric values as input to generate a set of Gaussian distributions (also referred to herein as 'Gaussian clusters' or 'clusters') as output. The set of Gaussian distributions can represent the second set of first metric values in a set of seasons. A season as described herein can be considered, for example, as presence of variations at regular or irregular time intervals and, in some instances, can be associated with a numerical index. In some instances, the set of seasons can include a first season corresponding to a high season, a second season corresponding to a low season, and a third season corresponding to a shoulder season. In some instances, the set of seasons can include meteorological seasons including winter, spring, summer, and autumn. In some instances, the high season can be associated with a numerical index of +1, the shoulder seasons can be associated with a numerical index of 0, and the low season can be associated with a numerical index of −1. In some instances, the set of seasons can be attributed to seasons associated with social conventions, regional conventions, and/or business conventions such as, for example, tax seasons, school seasons, holiday season, sea food season, Easter, and/or the like. The Gaussian mixture model 107 can receive the data and be trained using an unsupervised learning training method.

The Gaussian mixture model 107 can be configured to include a set of model parameters (e.g., weights, biases, activation functions, etc.) that once trained, can be executed to generate/identify a set of Gaussian distributions from the second set of first metric values, representing classes/seasons that collectively represent the data. The training of the set of model parameters of the Gaussian mixture model 107 can involve iteratively, generating Gaussian distributions and evaluating how well the Gaussian distributions represent the data to maximize a cost function (e.g., a softmax function, negative log-likelihood, etc.) using a gradient descent algorithm (e.g., Adagrad, Adam, etc.). In some instances, an expectation-maximization algorithm can be used to train the set of model parameters of the Gaussian mixture model 107. Each Gaussian distribution can be a representation of a unique Gaussian distributions from a set of Gaussian distributions within a set of histogram values.

The set of Gaussian distributions can include a set of means, a set of variance, and/or a set of mixing probabilities. Each Gaussian distribution can be symmetrically distributed around a centroid value, such as a mean, for the unique Gaussian distribution associated that Gaussian distribution. In some instances, the mean can be calculated by:

$$\mu = \frac{1}{N}\sum x_i$$

where μ represents the mean, N represent a number of elements in a Gaussian distribution, and $x_i$ represents each data that can include a first metric value and/or a second metric values. Each Gaussian distribution can also include a spreading that represents a variance of the set of histogram values for the unique Gaussian distributions associated with that Gaussian distribution. In some instances, the mean can be calculated by:

$$\sigma = \sqrt{\frac{\Sigma(x_i - \mu)^2}{N}}$$

where σ represents the variance.

In some embodiments, each Gaussian distribution can also include a mixing probability value that defines the size of each Gaussian distribution. The mixing probability of a Gaussian distribution can be a measure of likelihood that a data is from that Gaussian distribution. Therefore, a summation of all mixing probabilities of the data is generally equal to one:

$$\sum_{k=1}^{K} \pi_k = 1$$

where π represents the mixing probability.

The presentation portion 108 produces a set of adjusted first metric values based on the set of histogram values of the data. The set of adjusted first metric values include multiple subsets, each having a common adjusted first metric value and uniquely associated with an identified/generated season.

The auditor 109 is operatively coupled to the geometric aggregator 106, the Gaussian mixture model 107, and the presentation portion 108. The auditor 109 audits and identifies outlier status for the first set of adjusted first metric values. The auditor 109 selects a set of locations within a predefined distance of the first location. The auditor 109 further triggers the geometric aggregator 106, the Gaussian mixture model 107, and the presentation portion 108 to produce a set of adjusted first metric values for each location based on data for the set of time periods and the set of locations. The auditor 109 further calculates a variance between the set of adjusted first metric values for the first location and the set of adjusted first metric values for each location from the set of locations. The auditor 109 further identifies outlier status for at least one of the first location or any location from the set of locations based on the variance for the first location and each location from the set of locations.

In some implementations, the set of locations can include a first set of locations and a second set of locations (e.g., a set of location pair including the first of locations and the second set of locations). Moreover, the data for the set of time periods can be associated with the first set of locations and the second set of locations, and the first metric value and the second metric value for each time period can be associated with a first location and a second location. The auditor 109 can select a set of location pairs, each different from the remaining location pair from the set of location pairs. Each location pair includes a source location within a predefined distance of the first location and a destination location within a predefined distance of the second location. The auditor 109 can trigger the geometric aggregator 106, the Gaussian mixture model 107 and the presentation portion 108 to produce a set of adjusted first metric values for each location pair based on data for (1) the set of time periods and (2) the set of location pairs. The auditor 109 can calculate a variance between the set of adjusted first metric values for the first location and the set of adjusted first metric values for each location pair from the set of location pairs. The auditor 109 can identify outlier status for at least one of the first location or any location pair from the set of location pairs based on the variance for the first location and each location pair from the set of location pairs.

In one example, a first set of locations (e.g., London, Manchester, Brighton, etc.) and a second set of locations (e.g., Dubai, Abu Dhabi, Tallinn, etc.) can be associated with a set of metric values:

| First location | Second location | Metric Value |
| --- | --- | --- |
| London | Dubai | 100 |
| Manchester | Abu Dhabi, | 130 |
| Manchester | Tallinn | 80 |
| Brighton | Abu Dhabi | 110 |

Each column including a first location, a second location, and a metric value can represent a location pair or an event happening in relation to the location pair. Coordinates of each location from the first set of locations and second set of locations can be found (e.g., in a database of location coordinates):

| First location | Second location | First Latitude | First Longitude | Second Latitude | Second Longitude |
| --- | --- | --- | --- | --- | --- |
| London | Dubai | 51.5074 | 0.1278 | 25.2048 | 55.2708 |
| Manchester | Abu Dhabi | 53.4808 | 2.2426 | 24.4539 | 54.3773 |
| Manchester | Tallinn | 53.4808 | 2.2426 | 59.4370 | 24.7536 |
| Brighton | Abu Dhabi | 50.8225 | 0.1372 | 24.4539 | 54.3773 |

Next, a set of similar location pairs are identified. For example, locations that are within 200 kilometers of both the first location and the second location are identified and metric values associated with the location pairs are compared.

| First location | Second location | Distance to third location [km] | Distance to fourth location [km] | Total Distance Difference [km] |
| --- | --- | --- | --- | --- |
| Manchester | Abu Dhabi | 150 | 120 | 270 |
| Brighton | Abu Dhabi | 75 | 120 | 195 |

An average metric value for each location pair is calculated. The auditor 109 calculates a score for the data audit based on the difference between the metric value and the average metric value in absolute terms and/or as a ratio. In one example as provided in tables above, similar location pairs to London-Dubai are Manchester-Abu Dhabi and Brighton-Abu Dhabi. The average metric value for the location pairs is 120. London-Dubai metric value is 100, and therefore, the difference between the metric value and average metric value (i.e., the score) is 20. The score for location pairs can be used to quickly filter out location pairs with suspicious metric values (i.e., outliers). This allows for a quick and reliable identification of outlier (i.e., anomaly detection) and an opportunity to drill into cause of the suspicious metric value and possibly take remedial action (e.g., remove and/or modify data associated with the outlier information).

As shown in FIG. 1, the Gaussian classifier device 101 receives data for a set of time periods and a location and involves a two-level analysis to process the data. The data includes a first set of first metric values and a set of second metric values for each time period. The data for the set of time periods and the location can be noisy and lack Gaussian distribution characteristics. The geometric aggregator 106 of the Gaussian classifier device 101 calculate a geometric aggregation of the data for each time period to produce a second set of first metric values. The second set of first metric values includes a mixture of Gaussian distributions. The Gaussian classifier device 101 further implements a Gaussian mixture model 107 that receives the second set of first metric values from the geometric aggregator 106. The Gaussian mixture model 107 predicts a set of Gaussian distributions, for example, within a set of histogram values for the data based on the second set of first metric values. Each Gaussian distribution from the set of Gaussian distributions is uniquely associated with a season from a set of seasons over the set of time periods. The Gaussian classifier device 101 implements a presentation portion 108 that produces a set of adjusted first metric values based on the set of histogram values. The set of adjusted first metric values include subsets, each subset from the subsets having a common adjusted first metric value and uniquely associated with a season from the set of seasons.

As a result of the geometric aggregator 106 and the Gaussian mixture model 107, a set of adjusted first metric values uniquely associated with a Gaussian distribution identified by the Gaussian mixture model 107 is produced from the data (e.g., a noisy data including first metric values and second metric values). In some implementations, the geometric aggregator 106 and the Gaussian mixture model 107 can be repeatedly executed to update the first set of first metric values and to remove bias that may be originated from uncertainty of values of the first set of first metric values (e.g., uncertainty of future first set of first metric values in a relatively distant future).

In some implementations, the data for the set of time periods is associated with at least one location. Therefore, the first metric value and the second metric value for each time period is associated with the at least one location. In some implementations, the data for the set of time periods is associated with a first location and a second location. Therefore, the first metric value and the second metric value for each time period is associated with the first location and the second location.

In some embodiments, the unsupervised machine learning model is configured to receive, from a user of the Gaussian classification device 101 or a user of a user device 160, an indication of a number of seasons to generate a set of Gaussian distributions corresponding to the number of Gaussian distributions/seasons (e.g., two seasons, three seasons, ten seasons, and/or the like). In one example, a user of the Gaussian classification device 101 can provide an indication to classify a first data (e.g., data received by the database 170 and/or the set of user device 160) to 5 Gaussian distributions identifying levels of satisfaction of users of the user devices 160 during a specific duration and geographical location. In another example, the user of the Gaussian classification device 101 can provide an indication to classify a second data to 3 seasons of migration of birds identifying a first season corresponding to a high season, a second season corresponding to a low season, and a third season corresponding to a shoulder season.

In some implementations, the set of time periods can be a first set of time periods including a latest time period. The unsupervised machine learning model can operate at a first time based on the data for the first set of time periods. The unsupervised machine learning model can also operate a second time based on data for a second set of time periods after the first set of time periods. The second set of time periods includes a latest time period after the latest time period of the first set of time periods. In some instances, the second set of time periods can overlap with at least a portion of the first set of time periods.

In some instances, the Gaussian classification device 101 can receive and process multiple (e.g., 3, 10, 100, and/or the like) metric values (instead of a pair) and generate a set of Gaussian distributions from the multiple metric values. The geometric aggregator 106 can multiply the multiple metric values. In some instances, the geometric aggregator can multiply first metric values, second metric values, and third of metric values.

Figure 2:
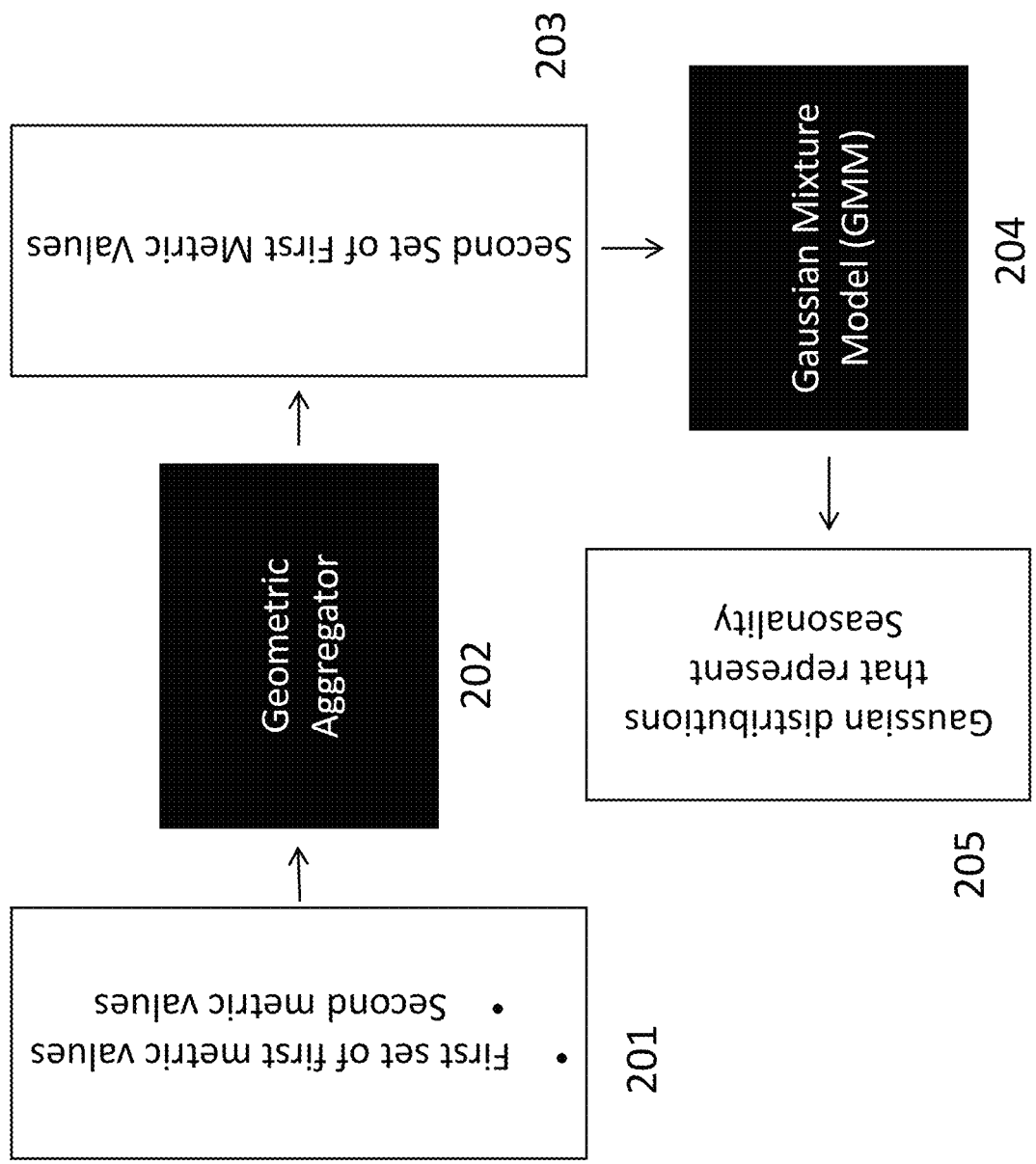
FIG. 2 is a flowchart illustrating a method of Gaussian classification, according to an embodiment.

FIG. 2 is a flowchart illustrating a method to train and use a Gaussian classification device, according to an embodiment. The method of training and using the Gaussian classification device (such as the Gaussian classification device 101 as shown and described with respect to FIG. 1) can mainly involve a two-step analysis performed by a) a geometric aggregator 202 and b) an unsupervised machine learning Gaussian mixture model 204.

The geometric aggregator 202 can be configured to receive a first set of first metric values and a second metric values 201 and producing a second set of first metric values 203. For a given set of locations (e.g., a location, a pair of locations, three locations, and/or the like) multiple sets of metric values can be available, each referring to a dimension. In some instances, the multiple sets of metric values can include a set of first metric values and/or a set of second metric values. For each combination of the set of first metric values and the set of second metric value, a value of each first metric value can be multiplied by a value of each second metric value to generate a set of products. In some implementations the lowest product can be selected (in some implementations the highest product can be selected), and the first metric value for that lowest product can be presented for the given location pairs. The aforementioned process can then be repeated over multiple days within a given time period (e.g., for a week, a quarter, a year, etc.) to generate a second set of first metric values.

The geometric aggregator can be used to generate a second set of first metric values. Then, the second step of analysis can be performed by the Gaussian mixture model 204. In particular, an unsupervised machine learning Gaussian mixture model 204 can be used to identify Gaussian distributions of first metric values using the second set of first metric values for a number of Gaussian distributions/seasons. In some implementations, the number of Gaussian distributions can be a predetermined number or a number specified by a user. In some implementations, the number of Gaussian distributions can be automatically detected to best represent the seasonality of data. In some instances, the Gaussian distributions or seasons can include three seasons of high season, low season, and shoulder season. Because the set of first metric values in a time period can be generally volatile and the first metric values inside a seasonal Gaussian distribution can vary quite a bit, the Gaussian mixture model 204 is used as the unsupervised machine learning model to account for variance in the data. The Gaussian mixture model 204 is a probabilistic model that can distribute the second set of first metric values into Gaussian distributions, representing seasonality. In Gaussian distributions, data points of the second set of first metric values can be distributed symmetrically around the mean of the Gaussian distribution and with a spread identified by a variance of the Gaussian distribution.

In some implementations, the unsupervised machine learning Gaussian mixture model 204 automatically identifies and/or reduces a number of Gaussian distributions. For example, the data may involve 10 local Gaussian distributions that can be categorized in three main Gaussian distributions including the 10 local Gaussian distributions. The unsupervised machine learning Gaussian mixture model 204, when executed, can automatically identify the three main Gaussian distributions representing seasonality of the data 205.

FIG. 3 is a flowchart illustrating a method 300 of Gaussian classification, according to an embodiment. In some implementations, a Gaussian classification device (such as the Gaussian classification device 101 as shown and described with respect to FIG. 1) can be used to perform the method 300. At 301, the Gaussian classification device can optionally receive data for a set of time periods and a location, the data having a first set of first metric values and a set of second metric values for each time period from the set of time periods. At 302, the Gaussian classification device can be configured to calculate, for each time period from the set of time periods, a geometric aggregation of the data for that time period to produce a first metric value from a second set of first metric values. Calculation of the geometric aggregation can be performed by a geometric aggregator (such as the geometric aggregator 106 as shown and described with respect to FIG. 1) of the Gaussian classification device.

At 303, the Gaussian classification device can be configured to apply an unsupervised machine learning Gaussian mixture model (such as the Gaussian mixture model 107 as shown and described with respect to FIG. 1) to the second set of first metric values to predict a set of Gaussian distributions within a set of histogram values for the data. Each Gaussian distribution from the set of Gaussian distributions can be uniquely associated with a season (e.g., a high season, a low season, and/or the like) from a set of seasons over the set of time periods. At 304, the Gaussian classification device can be configured to produce a set of adjusted first metric values based on the set of histogram values, where the set of adjusted first metric values includes a set of subsets, each subset from the set of subsets having a common adjusted first metric value from the set of adjusted first metric values and being uniquely associated with a season from the set of seasons.

At 305, the Gaussian classification device can optionally determine whether to retrain and/or recalculate the unsupervised machine learning Gaussian mixture model and/or the geometric aggregator. The determining can be done by, for example, auditing whether a subset of metric values from first set of first metric values is correctly classified in the set of Gaussian distributions and generating a first auditing score based on results of the auditing. In some instances, the geometric aggregator can be recalculated by, for example, new data that include a set of new first metric values and/or a set of new second metric values. The determination whether to retrain the unsupervised machine learning Gaussian mixture model can be performed by an auditor (such as the auditor 109 as shown and described with respect to FIG. 1). As a result of recalculating the geometric aggregator and/or retraining the unsupervised machine learning Gaussian mixture model, the Gaussian classification device can be configured to generate a recalculated geometric aggregation and/or a retrained unsupervised machine learning Gaussian mixture model.

In some embodiments, the Gaussian classification device can be configured to audit and generate a second auditing score for the recalculated geometric aggregation and/or the retrained unsupervised machine learning Gaussian mixture model to the starting model. The second auditing score can be compared to the first auditing score to determine if the recalculated geometric aggregation and/or the retrained unsupervised machine learning Gaussian mixture model improves classification by a predetermined (or preselected) value. If the classification is improved by the predetermined value, the recalculated geometric aggregation and/or the retrained unsupervised machine learning Gaussian mixture model can be used. Otherwise the geometric aggregation and/or the unsupervised machine learning Gaussian mixture model can be used instead. In some implementations, the first auditing score and/or the second auditing score can be associated with tolerance values (as shown and described with respect to FIG. 7). The tolerance values can indicate an interval in which a deviation of a first metric value form exact number of an adjusted metric values can be considered acceptable. The tolerance values can be described, for example, a normalized number from 0 to 1, a percentage value, or an absolute value with a same unit as the first metric values. In some embodiments, adjusting the geometric aggregation and/or the unsupervised machine learning Gaussian mixture model can be done without retraining the model. For example, an output of the geometric aggregation and/or the unsupervised machine learning Gaussian mixture model can be added and/or multiplied by a set of adjustment factors.

At 306, the Gaussian classification device can optionally send a signal representing the set of adjusted first metric values to cause an action for a future time period based on the set of adjusted first metric values, the future time period being after and uniquely associated with a time period from the set of time periods. For example, the adjusted first metric values associated with a first season from the set of seasons identified by the Gaussian classification device can represent an unexpectedly low performance of the first metric values. The Gaussian classification device can send the signal representing the first metric values and/or the adjusted first metric values to, for example, a graphical user interface (GUI) for a remedial action from a user of the Gaussian classification device. In some instances, the remedial action from the user can include calculating a set of adjustment values to be added to the first metric values for a second season after the first season. In some instances, the remedial action can involve for example identifying and removing a set of outliers in the first metric values and/or the adjusted first metric values. In some implementation, the remedial action can involve for example a decision (e.g., from the user) whether to retrain the geometric aggregation and/or the unsupervised machine learning Gaussian mixture model. In some instances, the remedial action can involve for example adjusting the tolerance values. In some instances, the remedial action can involve for example providing the new data including the set of new first metric values and/or the set of new second metric values.

FIG. 4 is a flowchart illustrating a method 400 of auditing Gaussian classification, according to an embodiment. In some implementations, a Gaussian classification device (such as the Gaussian classification device 101 as shown and described with respect to FIG. 1) can be used to perform the method 400. At 401, the Gaussian classification device can select a set of locations within a predefined distance of the first location. At 402, the Gaussian classification device can perform the receiving, the calculating, the applying and the producing of FIG. 3 for data for the set of time periods and the set of locations, to produce a set of adjusted first metric values for each location from the set of locations. At 403, the Gaussian classification device can be configured to calculate a variance between the set of adjusted first metric values for the first location and the set of adjusted first metric values for each location from the set of locations. At 404, the Gaussian classification device can be configured to identify outlier status for at least one of the first location or any location from the set of locations based on the variance for the first location and each location from the set of locations.

Figure 5:
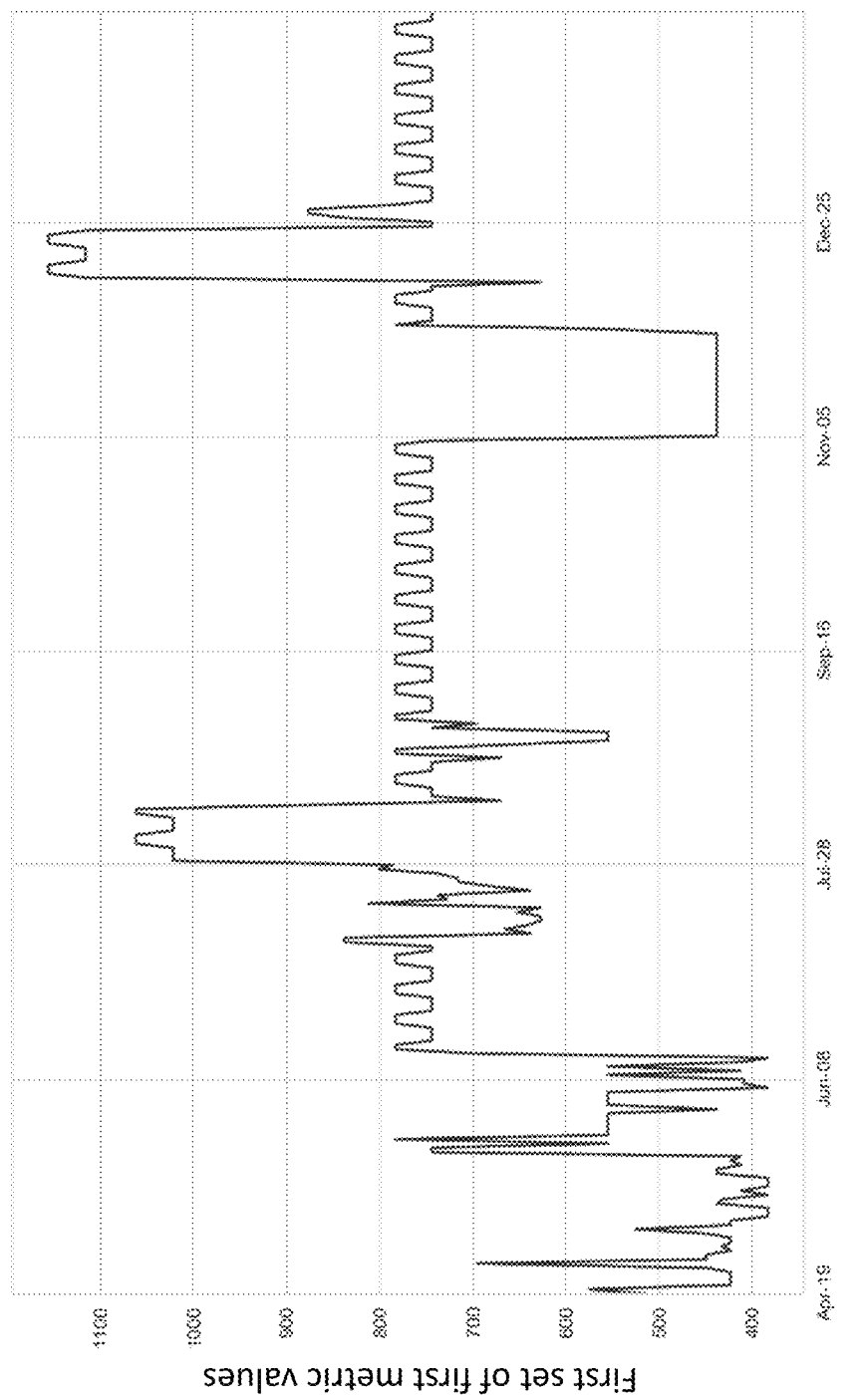
FIGS. 5-7 are examples of Gaussian classification, according to an embodiment.
Figure 6:
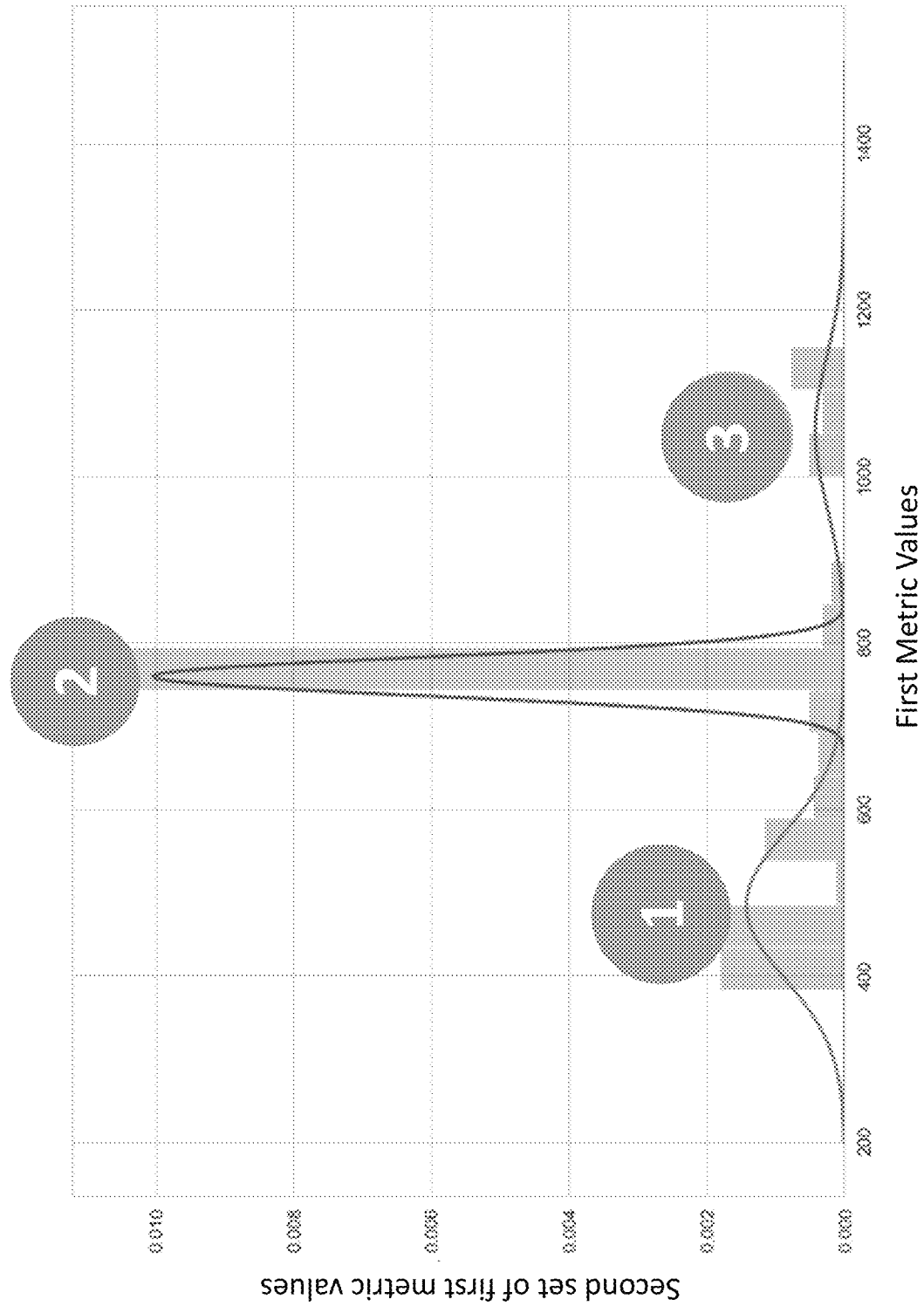
Figure 7:
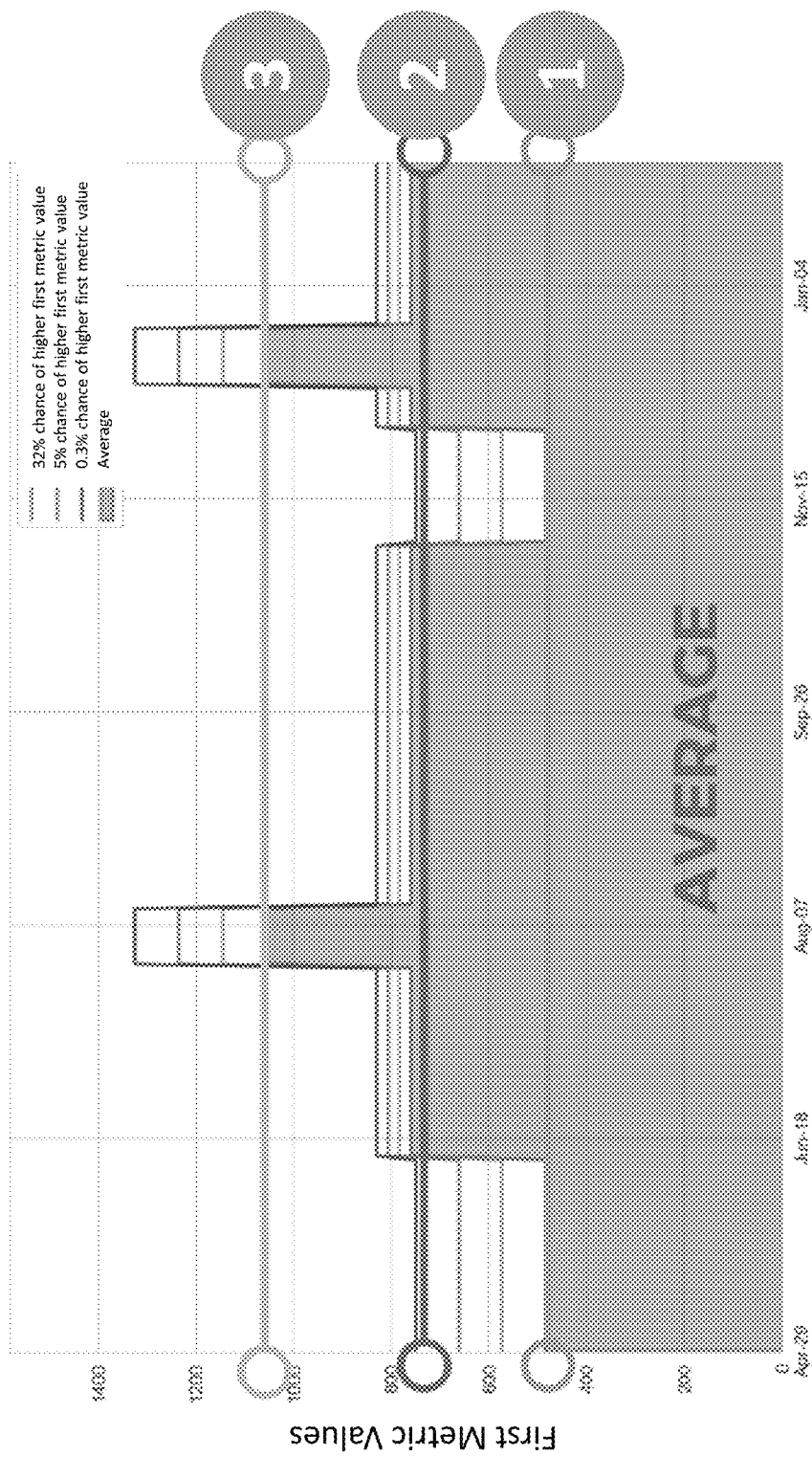

FIGS. 5-7 are examples of Gaussian classification, according to an embodiment. A Gaussian classification device (as shown and described with respect to FIG. 1) receives data including a set of first metric values and a set of second metric values for a set of time periods. In some instances, the data can include a set of third metric values, a set of fourth metric values, and so forth. As shown in FIG. 5, a first set of first metric values is received for each day from a set of days. The first set of first metric values can be noisy and discrete, which are not desired characteristics of data to be directly processed by Gaussian mixture models. A geometric aggregator and an unsupervised machine learning Gaussian mixture model can be used to generate a second set of first metric values and classify the data into a set Gaussian distributions (e.g., three Gaussian distributions 1, 2, and 3 of histograms of first metric values as shown in FIG. 6) representing seasonality of the data. Based on the set of Gaussian distributions a set of adjusted first metric values is generated that are uniquely associated with the set of Gaussian distributions. In some implementations, each adjusted first metric value includes a set of tolerance values that a first metric value is associated with that adjusted first metric value. In some instances, the set of tolerance values indicate tolerance intervals denoted as factors of population standard deviation, z-factors, 68-95-99.7 rule, and/or any other suitable tolerance intervals.

The first metric values and the second metric values can include, for example, a flight price(s), a flight duration(s), an indication(s) of lost luggage, a late flight(s), a customer feedback score(s), a temperature(s), a humidity value(s), a time schedule(s), and/or the like. As other examples the first metrics and the second metrics can include a shipping status, a train ride duration(s), a train ride price(s), a bus ride duration(s), a bus ride price(s), and/or the like. In some instances, the geometric aggregation can be performed for more than two metrics. For example, the metrics may include any two or more metrics from a flight duration(s), a flight price(s), a lost luggage, a late flight(s), a customer feedback score(s), a temperature(s), a humidity value(s), a time schedule(s), and/or the like. In some implementations, the two or more metrics can be multiplied together to produce a product from which the lowest value can be selected. For example, the first metric values can represent flight prices for a given day among various airlines/flights, prices of house rentals, and/or the like. Similarly, the second metric values can represent flight durations for a given day among various airlines/flights, or rental duration of house rentals, and/or the like. Alternatively, in some implementations, the highest value can be selected. For example, for calculating a good/optimal time to schedule a summer holiday, temperature values at a destination/locations can be multiplied by numbers of available hotel rooms during a set of time periods (a day(s), a week(s), etc.), and/or by ratings of hotels. In some instances, the good/optimal time to schedule the summer holiday is when a product of the multiplication is the highest.

Although the above discussion is generally discussed in the context of two locations (e.g., a source location and a destination location), in some instances, the methods and apparatus discussed herein can apply to a single location. For example, the Gaussian classification device as described herein can be applied to hotels, house rental, car rentals, car sharing, ride sharing, and/or the like, which can be performed with respect to a single location. In that sense, the location as described herein may be a source airport, a destination airport, a source station, a destination station, a house rental location, a pick-up location, and/or the like. For example, a Gaussian classification device can analyze car rental location and car rental duration to generate seasonal insights about car rentals.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
   a memory; and
   a processor operatively coupled to the memory, the processor configured to execute an unsupervised machine learning model having:
      a geometric aggregator configured to:
         receive, for a first location, first multi-dimensional data, each datum from the first multi-dimensional data including a first metric value, a second metric value, and a time, a plurality of first metric values in the first multi-dimensional data lacking a mixture of Gaussian distributions,
         divide the first multi-dimensional data into a plurality of time periods,
         calculate a geometric aggregation of each datum from the first multi-dimensional data by multiplying the first metric value and the second metric value of that datum, and
         produce a second plurality of first metric values by selecting a representative geometric aggregation for each time period from the plurality of time periods, the second plurality of first metric values having a mixture of Gaussian distributions and
      a Gaussian mixture model trained on a third plurality of first metric values not including the second plurality of first metric values, the Gaussian mixture model configured to (1) receive, after training the Gaussian mixture model, from the geometric aggregator the second plurality of first metric values and (2) predict a first plurality of Gaussian distributions within the second plurality of first metric values, each Gaussian distribution from the first plurality of Gaussian distributions being uniquely associated with a season from a plurality of seasons, each season from the plurality of seasons including a subset of time periods from the plurality of time periods, and
      an auditor configured to:
         calculate a first audit score for the first plurality of Gaussian distributions,
         identify a second location within a predefined distance of the first location,
         send, to the geometric aggregator, second multi-dimensional data associated with the second location such that the geometric aggregator calculates a geometric aggregation of each datum from the second multi-dimensional data to produce a fourth plurality of first metric values,
         cause the Gaussian mixture model to predict a second plurality of Gaussian distributions within the fourth plurality of first metric values,
         calculate a second audit score for the second plurality of Gaussian distributions, and
         retrain the Gaussian mixture model based on a difference between the first audit score and the second audit score exceeding a threshold value.

2. The apparatus of claim 1, wherein:
   each Gaussian distribution from the first plurality of Gaussian distributions represents a unique cluster from a plurality of clusters,
   each Gaussian distribution from the first plurality of Gaussian distributions being symmetrically distributed around a mean for the unique cluster associated with that Gaussian distribution,
   a spread of each Gaussian distribution from the first plurality of Gaussian distributions representing a variance of values for the unique cluster associated with that Gaussian distribution.

3. The apparatus of claim 1, wherein the unsupervised machine learning model is configured to receive, from a user device, an indication of a number of seasons within the plurality of seasons as selected.

4. The apparatus of claim 1, wherein the plurality of seasons includes a first season corresponding to a high season, a second season corresponding to a low season, and a third season corresponding to a shoulder season.

5. A method, comprising:
   receiving, for a first location, first multi-dimensional data, each datum from the first multi-dimensional data having a first metric value from a first plurality of first metric values, a second metric value from a first plurality of second metric values, and a time from a time plurality of times;
   calculating a first geometric aggregation of the first multi-dimensional data by multiplying pairs of first metric values and second metric values from the first plurality of first metric values and the first plurality of second metric values;
   produce a second plurality of first metric values by selecting a representative geometric aggregation for each time period from a plurality of time periods;
   applying an unsupervised machine learning Gaussian mixture model to the second plurality of first metric values to predict a plurality of Gaussian distributions for the first multi-dimensional data, each Gaussian distribution from the plurality of Gaussian distributions being uniquely associated with a season from a plurality of seasons, each season from the plurality of seasons including a subset of time periods from the plurality of time periods;
   receiving, for a second location within a predefined distance of the first location, second multi-dimensional data, each datum from the second multi-dimensional data having a first metric value from a third plurality of first metric values and a second metric value from a second plurality of second metric values;
   calculating a second geometric aggregation of the second multi-dimensional data by multiplying pairs of the first metric values and the second metric values from the third plurality of first metric values and the second plurality of second metric values;
   auditing the second plurality of first metric values using the second geometric aggregation;
   retraining the unsupervised machine learning Gaussian mixture model based on a result of auditing the second plurality of the first metric values such that a retrained unsupervised machine learning Gaussian mixture model produces a fourth plurality of first metric values based on at least one of the first multi-dimensional data or the second multi-dimensional data;
   producing, for each season from the plurality of seasons, an adjusted first metric value based on the fourth plurality of first metric values; and causing a flight from the first location to be scheduled during a season from the plurality of seasons based on the adjusted first metric value.

6. The method of claim 5, wherein the first plurality of first metric values lacks a mixture of Gaussian distributions, the second plurality of first metric values has a mixture of Gaussian distributions.

7. The method of claim 5, wherein, in addition to being associated with the first location, each datum from the first plurality of multi-dimensional data is associated with a third location from a plurality of locations, the first plurality of second metric values associated with at least one of a distance between the first location and the third location or a transit duration between the first location and the third location.

8. The method of claim 5, wherein:
each Gaussian distribution from the plurality of Gaussian distributions represents a unique cluster from a plurality of clusters,
each Gaussian distribution from the plurality of Gaussian distributions being symmetrically distributed around a mean for the unique cluster associated with that Gaussian distribution,
a spread of each Gaussian distribution from the plurality of Gaussian distributions representing a variance of values for the unique cluster associated with that Gaussian distribution.

9. The method of claim 5, further comprising:
receiving, from a user device and before the applying, an indication of a number of seasons within the plurality of seasons as selected.

10. The method of claim 5, wherein the plurality of seasons includes a first season corresponding to a high season, a second season corresponding to a low season, and a third season corresponding to a shoulder season.

11. A method, comprising:
receiving multi-dimensional data for a first location, each datum from the multi-dimensional data including a first metric value from a first plurality of first metric values, and a second metric value from a plurality of second metric values;
calculating a first geometric aggregation of each datum from the multi-dimensional data to produce a second plurality of first metric values;
applying an unsupervised machine learning Gaussian mixture model to the second plurality of first metric values to predict a plurality of Gaussian distributions each Gaussian distribution from the plurality of Gaussian distributions being uniquely associated with a season from a plurality of seasons, the unsupervised machine learning Gaussian mixture model trained based on third plurality of first metric values not including the second plurality of first metric values;
producing a plurality of adjusted first metric values based on the second plurality of first metric values, the plurality of adjusted first metric values including a plurality of subsets, each subset from the plurality of subsets having a common adjusted first metric value from the plurality of adjusted first metric values and being uniquely associated with a season from the plurality of seasons;
auditing the first plurality of adjusted first metric values by:
selecting a plurality of locations within a predefined distance of the first location;
performing the receiving, the calculating, the applying and the producing for multi-dimensional data for the plurality of locations, to produce a plurality of adjusted first metric values for each location from the plurality of locations;
calculating a variance between the plurality of adjusted first metric values for the first location and the plurality of adjusted first metric values for each location from the plurality of locations; and
identifying outlier status for at least one of the first location or any location from the plurality of locations based on the variance for the first location and each location from the plurality of locations
retraining the Gaussian mixture model based on the variance for the first location and each location from the plurality of locations; and
revising the first plurality of adjusted first metric values based on the outlier status for at least one of the first location or any location from the plurality of locations.

12. The method of claim 11, wherein the multi-dimensional data for the first location lacks a mixture of Gaussian distributions, the second plurality of first metric values has a mixture of Gaussian distributions.

13. The method of claim 11, wherein the multi-dimensional data is associated with the first location and a second location, the first metric value and the second metric value being associated with the first location and the second location.

* * * * *